US006831705B2

(12) United States Patent
Yamamoto

(10) Patent No.: US 6,831,705 B2
(45) Date of Patent: Dec. 14, 2004

(54) TELEVISION TUNER AND TELEVISION RECEIVER

(75) Inventor: Kazuhiko Yamamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 495 days.

(21) Appl. No.: 10/037,672

(22) Filed: Jan. 3, 2002

(65) Prior Publication Data
US 2002/0093598 A1 Jul. 18, 2002

(30) Foreign Application Priority Data
Jan. 15, 2001 (JP) ........................................ 2001-000115

(51) Int. Cl.$^7$ .............................. H04N 5/50; H04N 5/44
(52) U.S. Cl. ...................................... 348/731; 348/725
(58) Field of Search ................................. 348/731, 725, 348/732, 733, 730; 455/571, 182.3, 179.1, 185.1, 192.3; H04N 5/50, 5/44

(56) References Cited

U.S. PATENT DOCUMENTS 5,134,486 A * 7/1992 Suzuki et al. ............... 348/730
5,212,553 A * 5/1993 Maruoka .................... 348/725
5,296,932 A * 3/1994 Long ......................... 348/731

FOREIGN PATENT DOCUMENTS

| JP | 61-206325 | 9/1986 |
| JP | 2-28154 | 2/1990 |
| JP | 10-233972 | 9/1998 |
| JP | 2000-13700 | 1/2000 |

OTHER PUBLICATIONS

Patent abstracts of Japan, Publication No. 2000–013700, Publication Date Jan. 14, 2000, 1 page.
Patent abstracts of Japan, Publication No. 10–233972, Publication Date Sep. 2, 1998, 1 page.

* cited by examiner

Primary Examiner—Sherrie Hsia
(74) Attorney, Agent, or Firm—Osha & May L.L.P.

(57) ABSTRACT

The television tuner 15a has a reference frequency for each channel number of television radio wave, and can be tuned to a television radio wave of a channel number on the basis of a reference frequency of the channel number, when setting the channel number. The television tuner 15a includes a booster 31 for boosting the television radio wave to be fed to an RF amplifier, inhibiter 29 for inhibiting the operation of the booster 31 by an external operation, and a memory 30 for memorizing an operation state of the inhibiter 29 corresponding to the channel number when setting the tuning frequency as the frequency of the channel number. When the channel number is selected, the inhibiter 29 is placed in the operation state memorized by the memory 30 corresponding to the channel number.

4 Claims, 6 Drawing Sheets

FIG. 3

| CHANNEL NUMBER | FLAG STATE |
|---|---|
| 1 | 0 |
| 2 | 1 |
| 4 | 0 |
| 6 | 0 |
| 8 | 1 |
| ⋮ | ⋮ |

0: OFF
1: ON

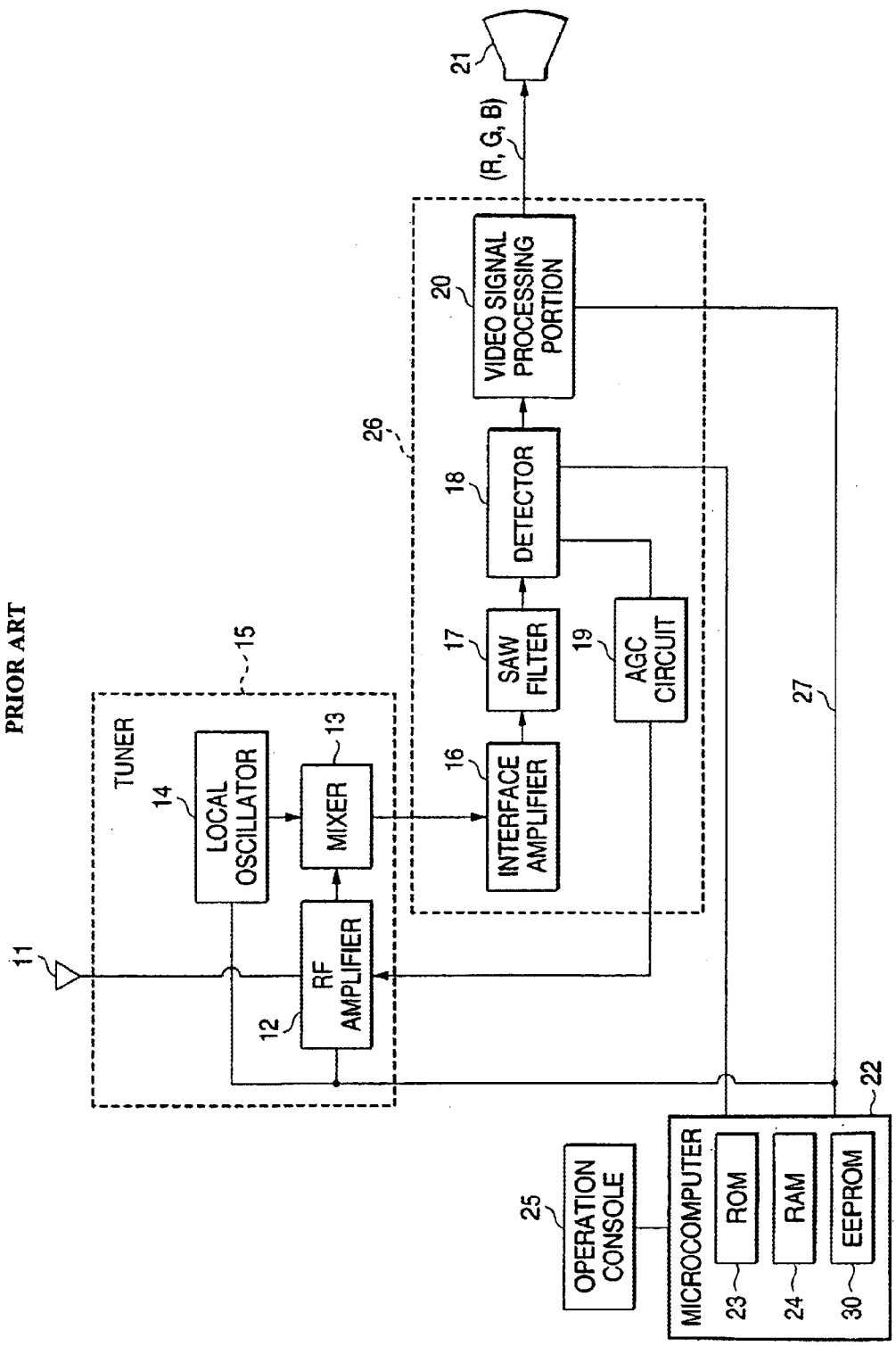

TELEVISION TUNER AND TELEVISION RECEIVER

BACKGROUND OF THE INVENTION

1. Technical Field

The present invention relates to a television tuner for tuning in a television radio wave by changing a tuning frequency on the basis of a reference frequency for each channel number, the tuning frequency that is tuned being set as the frequency of a channel number, when setting the channel number, and a television receiver having the television tuner.

2. Prior Art

FIG. 6 is a block diagram showing an exemplary configuration of the essence of the conventional television receiver. In this television receiver, an RF (Radio Frequency) signal received by an antenna 11 is tuned and amplified by an RF amplifier 12 that is a tuning circuit of an electronic tuner. The tuned and amplified RF signal is mixed with an oscillating signal from a local oscillator 14 phase locked by a PLL (Phase Lock Loop) circuit, not shown, by a mixer 13, and then converted into an IF (Intermediate Frequency) signal. A tuner 15 is composed of the RF amplifier 12, the local oscillator 14 and the mixer 13.

The IF signal is amplified by an IF amplifier 16, and band limited by a SAW (Surface Acoustic Wave) filter 17, whereby the band-limited IF signal has its level detected by a detector 18. The detected result of the level is passed to an AGC (Automatic Gain Control) circuit 19, which then outputs a gain control signal on the basis of the detected result given. The RF amplifier 12 has its gain controlled in accordance with the gain control signal output from the AGC circuit. With this gain control, when a strong electric field signal is received, the tuner 15 itself is prevented from being overloaded and causing false modulation.

The IF signal has the color signals R, G, B, a horizontal synchronizing signal and a vertical synchronizing signal extracted in a video signal processing portion 20, the extracted color signals R, G, B being input into a CRT 21. In the CRT 21, the color signals R, G, B are turned into the electron beams having respective intensities, and the horizontal scanning and the vertical scanning are performed by a drive circuit, not shown, based on the horizontal synchronizing signal and the vertical synchronizing signal.

The IF amplifier 16, the SAW filter 17, the detector 18, the AGC circuit 19 and the video signal processing portion 20 are integrally formed on an IC 26.

The RF amplifier 12, the local oscillator 14 and the video signal processing portion 20 are operated under the control of a microcomputer 22 connected via a bus 27. The microcomputer 22 has a ROM (Read Only Memory) 23 storing its operation program and the reference frequency of the television radio wave for each channel number, a RAM (Random Access Memory) 24 temporarily storing the data associated with the operation, and an $E^2$ PROM (Electrically Erasable ROM) 30 storing the channel set frequency for each channel number.

The microcomputer 22 is connected to an operation console 25 with the operation buttons, and is supplied with the detected result of the IF signal level detected by the detector 18.

The frequency of television radio wave is allocated to each country or area by the CCIR (International Radio Committee) to avoid the interference, in which the frequency for each channel number is greatly different depending on the country or area.

In the apparatus manufacturing company for producing television receivers and video tape recorders, a channel plan that is a list of reference frequencies for the channel numbers is created for each destination with reference to a list of channel receiving frequencies for the destination as defined by the CCIR, and stored in the ROM for the microcomputer incorporated in the apparatus to be produced.

The user can make a channel setting operation simply in an automatic or manual channel preset mode, using this channel plan.

The maximum amount of drift from the center frequency (reference frequency) of each channel number is set up to make it possible to receive the broadcasting even in the case where the broadcasting frequency is off the reference frequency, or a newly opened broadcasting station broadcasts at a frequency off the reference frequency in the channel plan, whereby the broadcasting can be received within a set range. This range is referred to as a "cover range", which is assigned to the plus or minus side from the center frequency of each channel number.

As above constituted, in the case where the channel is set up in an automatic channel preset mode, the television receiver is tuned to a television radio wave for each channel number by changing the tuning frequency of the RF amplifier 12 within the cover range around the center frequency that is the reference frequency of each channel number stored in the ROM 23, and the tuning frequency that is tuned is set up as the frequency of the channel number successively and stored in the $E^2$ PROM 30.

When the channel number is selected, the television radio wave at the frequency of each selected channel number that is set up and stored in the $E^2$ PROM 30 is received.

Also, in the case where the channel is set up in a manual channel preset mode, the television receiver is tuned to a television radio wave of the selected channel number by changing the tuning frequency of the RF amplifier 12 within the cover range around the center frequency that is the reference frequency of a selected channel number stored in the ROM 23, and the tuning frequency that is tuned is setup as the frequency of the channel number successively and stored in the $E^2$ PROM 30.

When the channel number is selected, the television radio wave at the frequency of each selected channel number that is set up and stored in the $E^2$ PROM 30 is received.

[Problems to be Solved]

In the conventional television receiver, in the case where the television radio wave of the channel number for a broadcasting station had extremely low power due to the reason that the broadcasting station was located at the remote site, a wide band RF amplifier (booster) was attached externally to amplify the television radio wave from the antenna and pass the amplified radio wave to the tuner. However, if the television radio wave for all the channel numbers is amplified by the booster, the television radio wave of the channel number at which the power of radio wave is not extremely low is too strong, giving rise to some input distortion. Therefore, there is a problem that the recipient must turn on or off the booster depending on whether the screen condition is excellent or not.

As a technique to solve this problem, a "television receiver" containing a radio frequency booster for wide band amplification without having to purchase the booster and attach it externally was disclosed in the Unexamined Japanese Patent Application Publication No. Sho61-206325.

SUMMARY OF THE INVENTION

This invention is achieved in the light of the above-mentioned problems, and it is an object of the invention to provide a television tuner containing a wide band RF amplifier and not requiring to turn on or off the wide band RF amplifier for each channel, in which the excellent characteristics of image quality can be attained, irrespective of whether the television radio wave is weak or strong in the electric field.

Also, it is another object of the invention to provide a television receiver with the television tuner.

[Means for Solving the Problems]

According to a first aspect of the invention, there is provided a television tuner having a reference frequency for each channel number of television radio wave, which can be tuned to a television radio wave of a channel number by changing a tuning frequency of an RF amplifier on the basis of the reference frequency of the channel number, when setting the channel number, the tuning frequency that is tuned is set up as the frequency of the channel number, and the television radio wave of the set frequency is received as the television radio wave of the channel number, the television tuner characterized by comprising a booster for boosting the television radio wave to be fed to the RF amplifier, inhibit means for inhibiting the operation of the booster by an operation from the outside, and memory means for memorizing an operation state of the inhibit means corresponding to the channel number when setting the tuning frequency as the frequency of the channel number, wherein when the channel number is selected, the inhibit means is placed in the operation state memorized by the memory means corresponding to the channel number.

This television tuner has a reference frequency for each channel number of television radio wave, and can be tuned to accept a television radio wave of a channel number by changing the tuning frequency of the RF amplifier on the basis of the reference frequency of the channel number, the tuning frequency that is tuned being set up as the frequency of the channel number, and the television radio wave at the set frequency being received as the television radio wave of the channel number. The booster is provided to boost the television radio wave to be fed to the RF amplifier, and the inhibit means inhibits the operation of the booster upon an operation from the outside. When the tuning frequency is set as the frequency of the channel number, the memory means memorizes an operation state of the inhibit means corresponding to the channel number. And when the channel number is selected, the inhibit means is placed in the operation state memorized by the memory means corresponding to the channel number.

Thereby, it is possible to realize the television tuner containing a wide band RF amplifier, and not requiring to turn on or off the wide band RF amplifier for each channel, in which the excellent characteristics of image quality can be obtained irrespective of whether or not the television radio wave is weak or strong in the electric field.

According to a second aspect of the invention, there is provided a television tuner having a reference frequency for each channel number of television radio wave, which can be tuned to a television radio wave of a channel number by changing a tuning frequency of an RF amplifier successively on the basis of the reference frequency of the channel number, when setting the channel number, the tuning frequency that is tuned is set up successively as the frequency of the channel number, and the television radio wave of the set frequency that is set up successively is received as the television radio wave of the channel number, the television tuner characterized by comprising a booster for boosting the television radio wave to be fed to the RF amplifier, inhibit means for inhibiting the operation of the booster, determination means for determining whether or not the signal level of the tuning frequency that is tuned to the television radio wave of the channel number is greater than or equal to a predetermined value, means for turning off the operation of the inhibit means, if the determination means determines that the signal level is not greater than or equal to the predetermined value, means for tuning in the television radio wave by changing the tuning frequency of the RF amplifier in a state where the inhibit means is turned off, and memory means for memorizing an operation state of the inhibit means corresponding to the channel number when setting the tuning frequency to which the means is tuned as the frequency of the channel number, wherein when the channel number is selected, the inhibit means is placed in the operation state memorized by the memory means corresponding to the channel number.

This television tuner has a reference frequency for each channel number of television radio wave, and can be tuned to a television radio wave of a channel number by changing a tuning frequency of the RF amplifier successively on the basis of the reference frequency of each channel number, when setting the channel number, in which the tuning frequency that is tuned is set up successively as the frequency of the channel number, and the television radio wave of the set frequency that is set up successively is received as the television radio wave of the channel number. The booster boosts the television radio wave to be fed to the RF amplifier, and the inhibit means inhibits the operation of the booster. The determination means determines whether or not the signal level of the tuning frequency that is tuned to the television radio wave of the channel number is greater than or equal to a predetermined value, and the turning off means turns off the operation of the inhibit means, if the determination means determines that the signal level is not greater than or equal to the predetermined value. The tuning means is tuned to the television radio wave by changing the tuning frequency of the RF amplifier in a state where the inhibit means is turned off, and the memory means memorizes an operation state of the inhibit means corresponding to the channel number when setting the tuning frequency that is tuned as the frequency of the channel number. When the channel number is selected, the inhibit means is placed in the operation state memorized by the memory means corresponding to the channel number.

Thereby, it is possible to realize the television tuner containing a wide band RF amplifier, and not requiring to turn on or off the wide band RF amplifier for each channel, in which the excellent characteristics of image quality can be obtained irrespective of whether or not the television radio wave is weak or strong in the electric field.

According to a third aspect of the invention, there is provided a television receiver comprising the television tuner as above described.

Since this television receiver comprises the television tuner containing the wide band RF amplifier, and not requiring to turn on or off the wide band RF amplifier for each channel as above described, the television receiver can be realized in which the excellent characteristics of image quality can be obtained irrespective of whether or not the television radio wave is weak or strong in the electric field.

BRIEF DESCRIPTION OF THE DRAWINGS

FIG. 3 is an explanatory table for explaining the operation of the television tuner and the television receiver according to the embodiment of the invention.

FIG. 6 is a block diagram showing an exemplary configuration of the conventional television receiver.

DETAILED DESCRIPTION OF THE PREFERRED EMBODIMENTS

[Embodiments]

The preferred embodiments of the present invention will be described below with reference to the accompanying drawings.

Figure 1:
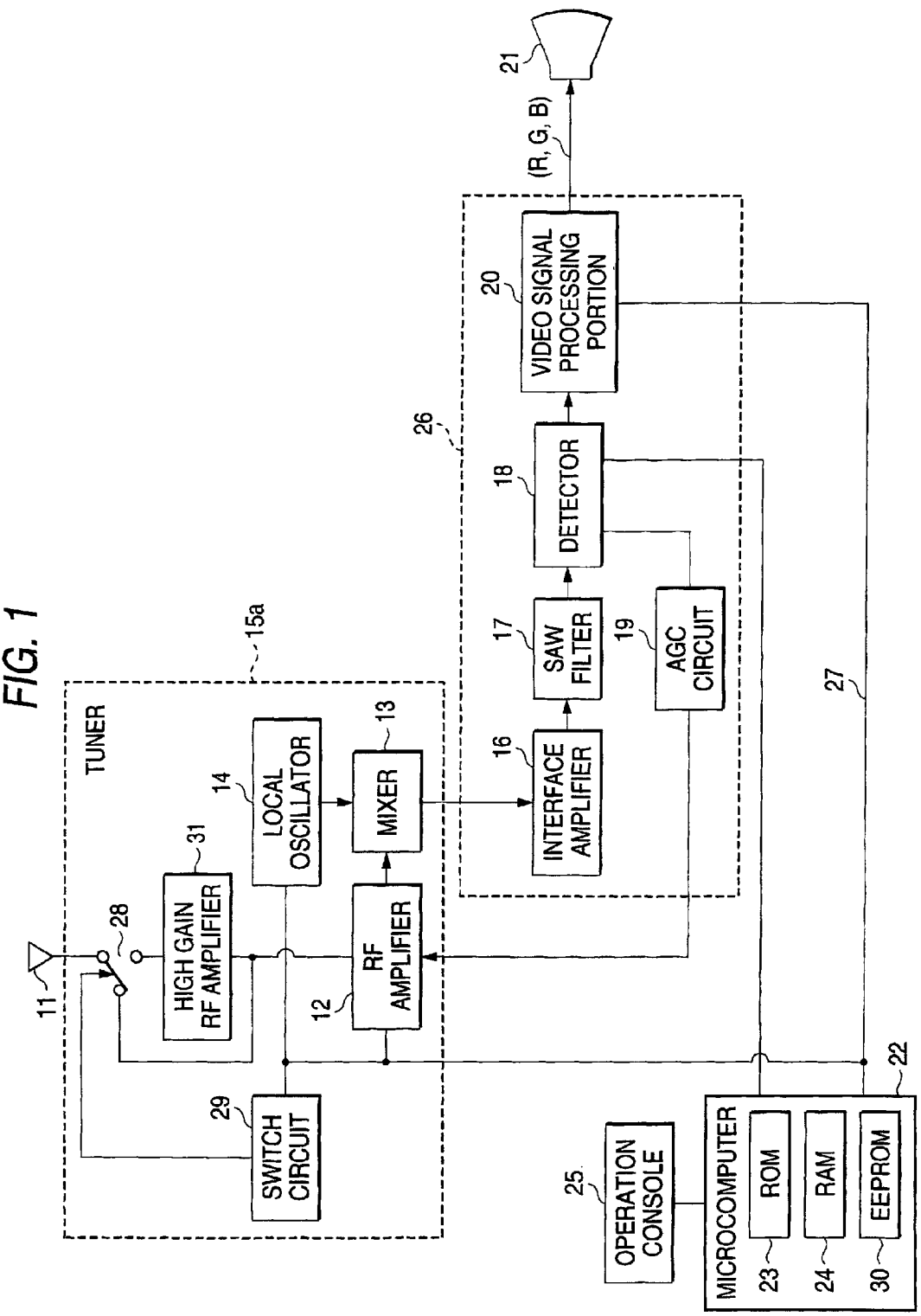
FIG. 1 is a block diagram showing the configuration of a television tuner and a television receiver according to an embodiment of the present invention.

FIG. 1 is a block diagram showing the configuration of a television tuner and a television receiver according to an embodiment of the invention. In this television receiver, an RF (Radio Frequency) signal that is a television radio wave received from an antenna 11 is passed via a contact point 28 of a switch circuit 29 (inhibit means) to a high gain RF amplifier 31 (booster, amplifier) for wide band and amplified. The switch circuit 29 switches the contact point 28 to an input terminal or a bypass terminal of the high gain RF amplifier 31 under the control of a microcomputer 22 as will be described later to turn on or off the inhibit means.

An RF signal amplified or bypassed by the high gain RF amplifier 31 is tuned and amplified by an RF amplifier 12 that is a tuning circuit for an electronic tuner. The tuned and amplified RF signal is mixed with an oscillating signal from a local oscillator 14 that is phase locked by a PLL (Phase Lock Loop) circuit, not shown, and converted in to an IF (Intermediate Frequency) signal. The tuner 15a (television tuner) is made up of the high gain RF amplifier 31, the RF amplifier 12, the local oscillator 14 and the mixer 13.

The IF signal is amplified by an IF amplifier 16, and band limited by a SAW (Surface Acoustic Wave) filter 17, whereby the band-limited IF signal has its level detected by a detector 18. The detected result of the level is passed to an AGC (Automatic Gain Control) circuit 19, which then outputs a gain control signal on the basis of the detected result given. The RF amplifier 12 has its gain controlled in accordance with the gain control signal output from the AGC circuit. With this gain control, when a strong electric field signal is received, the tuner 15 itself is prevented from being overloaded and causing false modulation.

From the IF signal, the color signals R, G, B, a horizontal synchronizing signal and a vertical synchronizing signal are extracted in a video signal processing portion 20, extracted color signals R, G, B being input into a CRT 21. In the CRT 21, the color signals R, G, B are turned into the electron beams having respective intensities, and the horizontal scanning and the vertical scanning are performed by a drive circuit, not shown, based on the horizontal synchronizing signal and the vertical synchronizing signal.

The IF amplifier 16, the SAW filter 17, the detector 18, the AGC circuit 19 and the video signal processing portion 20 are integrally formed on an IC 26.

The switch circuit 29, the RF amplifier 12, the local oscillator 14 and the video signal processing portion 20 are operated under the control of the microcomputer 22 connected via a bus 27. The microcomputer 22 has a ROM (Read Only Memory) 23 storing its operation program and the reference frequency (channel reference frequency) of the television radio wave for each channel number, a RAM (Random Access Memory) 24 temporarily storing the data associated with the operation, and an $E^2$ PROM (Electrically Erasable ROM, memory means) 30 storing the channel set frequency for each channel number and the operation state of the switch circuit 29 for each channel number that is the operation state of the inhibit means for each channel number.

The microcomputer 22 is connected to an operation console 25 with the operation buttons, and is supplied with the detected result of the IF signal level detected by the detector 18.

Figure 2:
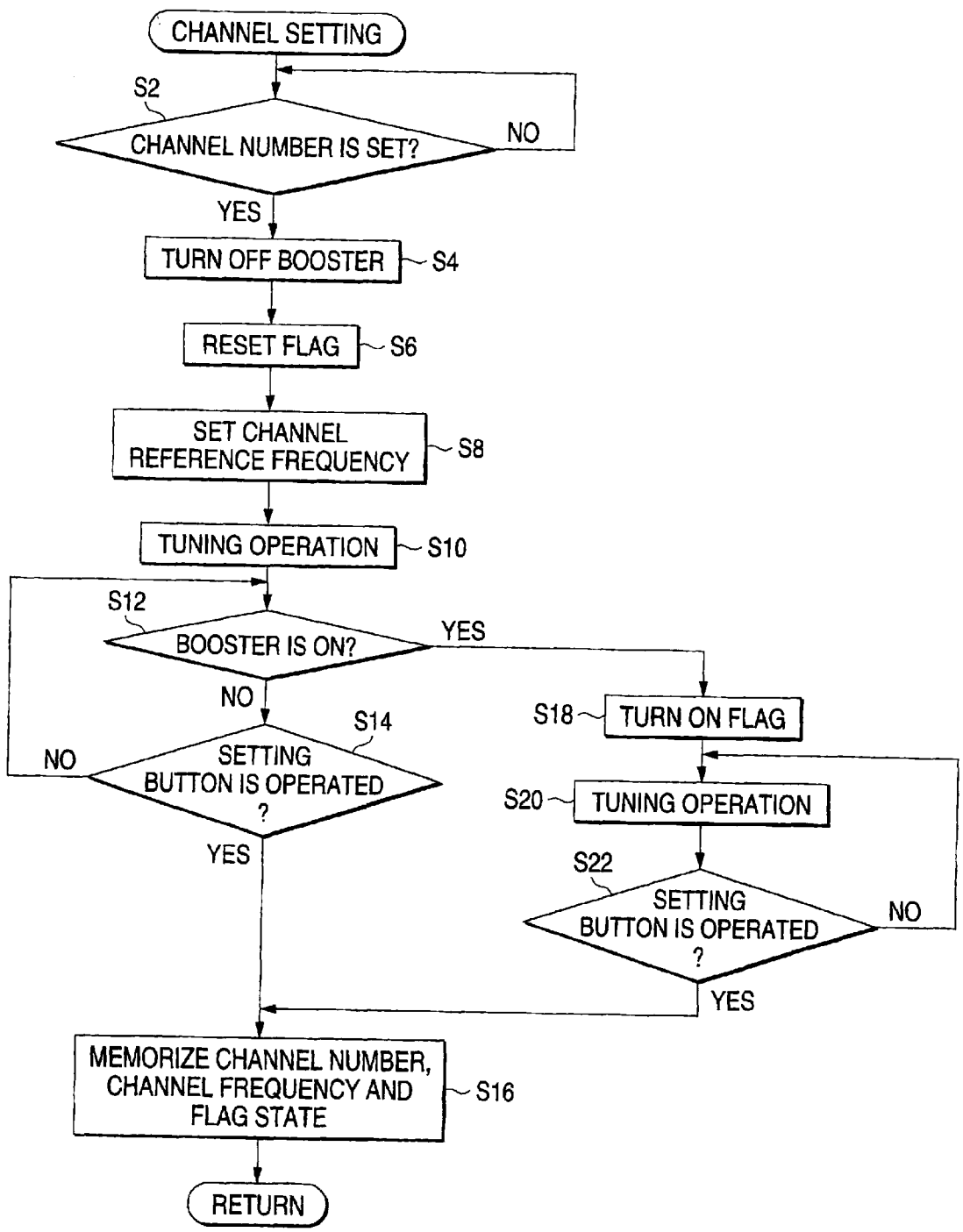
FIG. 2 is a flowchart showing the operation of the television tuner and the television receiver according to the embodiment of the invention.
Figure 4:
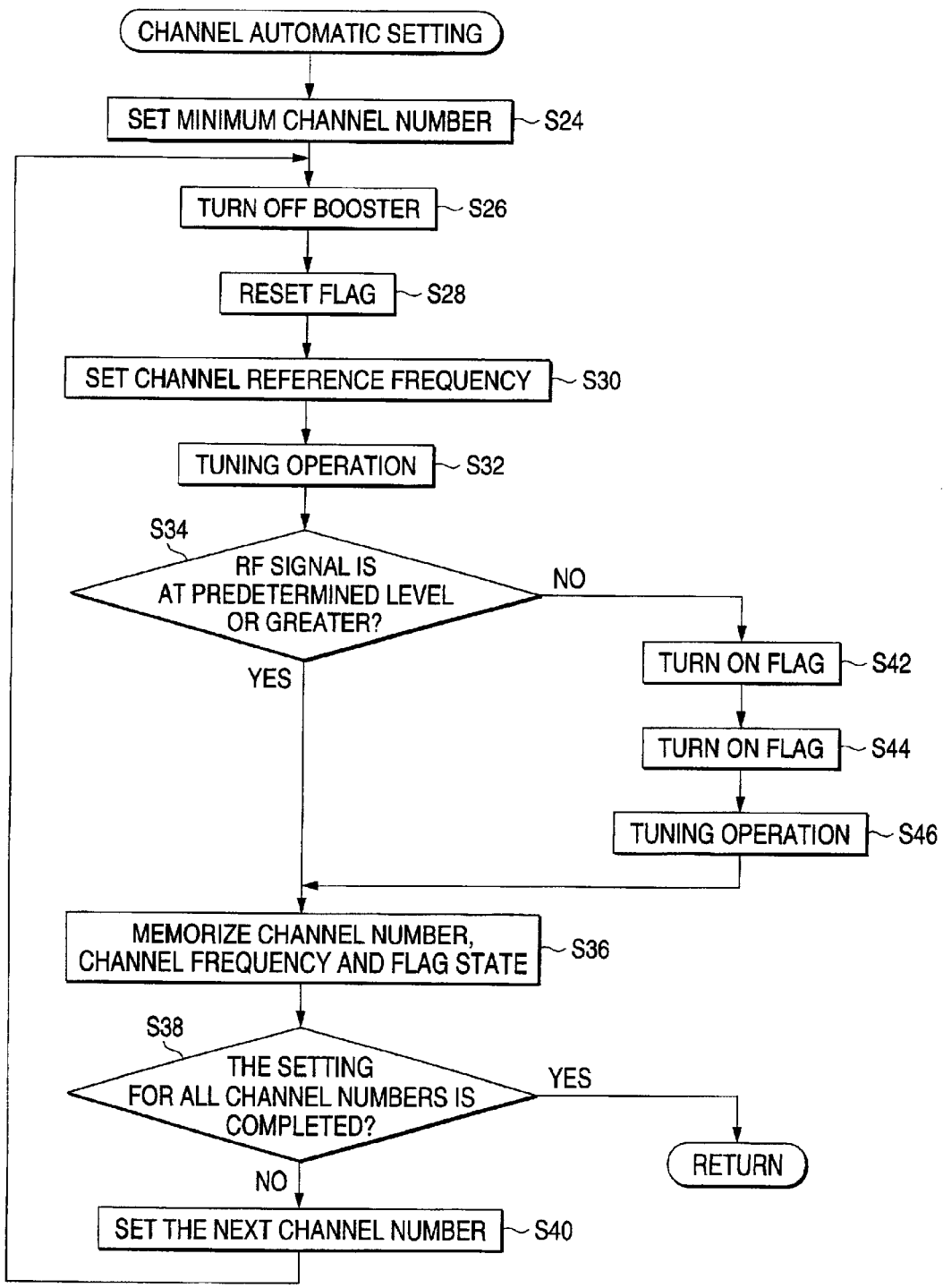
FIG. 4 is a flowchart showing the operation of the television tuner and the television receiver according to the embodiment of the invention.
Figure 5:
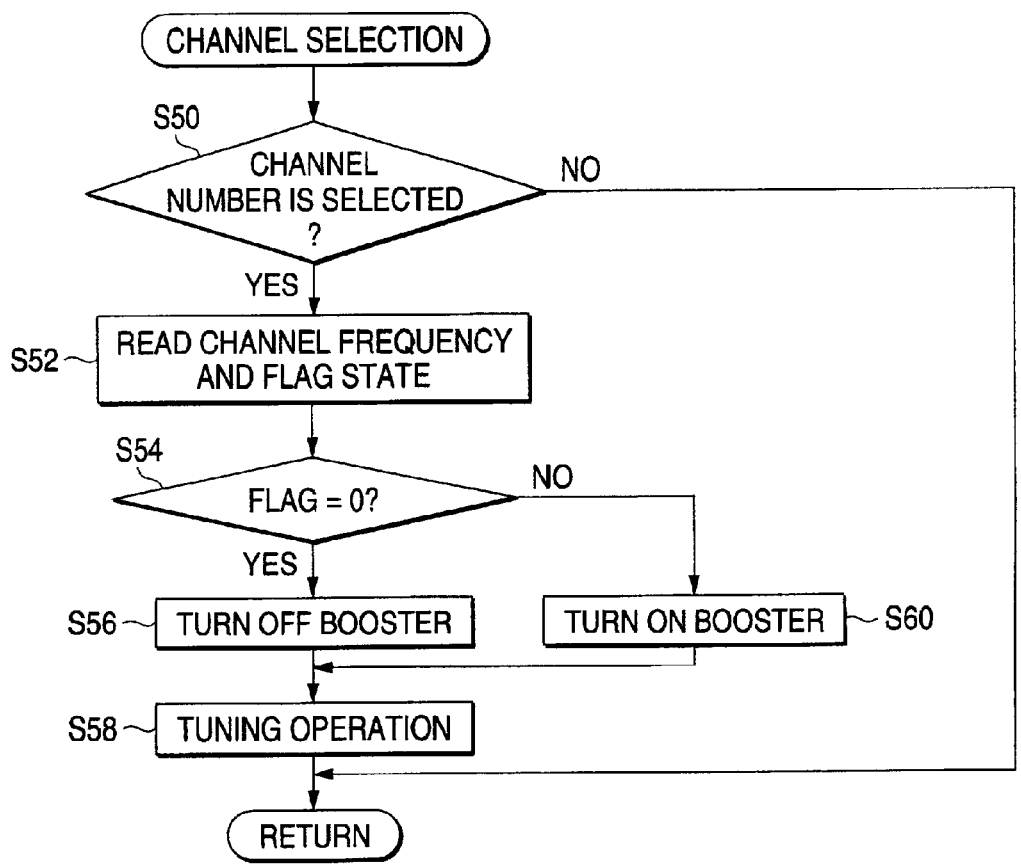
FIG. 5 is a flowchart showing the operation of the television tuner and the television receiver according to the embodiment of the invention.

Referring now to the flowcharts of FIGS. 2, 4 and 5, the operation of the television receiver will be set forth.

In the case where the channel setting is made in a manual channel preset mode, the microcomputer 22 for the television receiver switches the contact point 28 to the bypass terminal side of the high gain RF amplifier 31, if the channel number is firstly selected and set up (S2). Thereby, the booster 31 (high gain RF amplifier 31 for wide band) is turned off (S4), and a flag indicating the operation state of the switch circuit 29 is reset (S6).

Then, the microcomputer 22 reads and sets up the reference frequency for the set channel number (S2) that is stored in the ROM 23 (S8), and changes the tuning frequency of the RF amplifier 12 within the cover range around the center frequency that is the set reference frequency to effect the tuning operation of the television radio wave for the set channel number (S10).

If after the tuning operation (S10), the booster 31 is not turned on (S12), and a setting button of the operation console 25 is operated (S14), the microcomputer 22 stores the channel frequency of the television radio wave tuned by the tuning operation (S10) and the state of the flag (i.e., off in this case) indicating the operation state of the switch circuit 29 in correspondence to its channel number in the $E^2$ PROM 30 (but the channel frequency is in another format) as shown in FIG. 3(S16), and then the procedure returns.

If after the tuning operation (S10), the booster 31 is turned on (S12), the microcomputer 22 turns on the flag indicating the operation state of the switch circuit 29 (S18), and then changes the tuning frequency of the RF amplifier 12 within the cover range around the center frequency that is the set reference frequency (S8) to effect the tuning operation of the television radio wave for the set channel number (S20).

If after the tuning operation (S10), and a setting button of the operation console 25 is operated (S22), the microcomputer 22 stores the channel frequency of the television radio wave tuned by the tuning operation (S20) and the state of the flag (i.e., on in this case) indicating the operation state of the switch circuit 29 in correspondence to its channel number in the $E^2$PROM 30 (but the channel frequency is in another format) as shown in FIG. 3(S16), and then the procedure returns.

In the case where the channel setting is made in an automatic channel preset mode, the microcomputer 22 for this television receiver firstly sets up the minimum channel number (S24 in FIG. 4), turns off the booster 31 (S26) by switching the contact point 28 to the bypass terminal side of the high gain RF amplifier 31 using the switch circuit 29, and resets the flag indicating the operation state of the switch circuit 29 (S28).

Then, the microcomputer 22 reads and sets up the reference frequency for the set channel number (S24) that is stored in the ROM 23 (S30), and changes the tuning frequency of the RF amplifier 12 within the cover range around the center frequency that is the set reference frequency to effect the tuning operation of the television radio wave for the set channel number (S32)

After the tuning operation (S32), the microcomputer 22 determines whether or not the RF signal detected by the detector 18 is at a predetermined level or greater (S34). If the RF signal is at the predetermined level or greater, the microcomputer 22 stores the channel frequency of the television radio wave tuned by the tuning operation (S32) and the state of the flag (i.e., off in this case) indicating the operation state of the switch circuit 29 in correspondence to its channel number in the $E^2$ PROM 30 (but the channel frequency is in another format) as shown in FIG. 3 (S36).

If the RF signal detected by the detector 18 is not at the predetermined level or greater (S34), the microcomputer 22 turns on the booster 31 (S42) by switching the contact point 28 to the input terminal side of the high gain RF amplifier 31 using the switch circuit 29, and turns on the flag indicating the operation state of the switch circuit 29.

After turning on the flag (S44), the microcomputer 22 changes again the tuning frequency of the RF amplifier 12 within the cover range around the center frequency that is the set reference frequency (S30) to effect the tuning operation of the television radio wave for the set channel number (S46).

After the tuning operation (S46), the microcomputer 22 stores the channel frequency of the television radio wave tuned by the tuning operation and the state of the flag (i.e., on in this case) indicating the operation state of the switch circuit 29 in the $E^2$ PROM 30 (but the channel frequency is in another format) as shown in FIG. 3 (S36).

Then, if the channel frequency settings for all the channel numbers are not completed (S38), the microcomputer 22 sets up the next smallest channel number (S40), and repeats all the steps that follow the step (S26) of turning off the booster 31.

If the channel frequency settings for all the channel numbers are completed (S38), the microcomputer 22 exits from the automatic channel preset mode, and the procedure returns.

When not in the channel preset mode, if the channel number is selected in the operation console 25 (S50 in FIG. 5), the microcomputer 22 reads the channel frequency for that channel number, and the state of the flag indicating the operation state of the switch circuit 29 for that channel number as shown in FIG. 3 from the $E^2$ PROM 30 (S52)

If the state of the read flag (S52) is off (=0; reset) (S54), the microcomputer 22 turns off the booster 31 by switching the contact point 28 to the bypass terminal side of the high gain RF amplifier 31 by means of the switch circuit 29 (S56), and makes the tuning operation (S58) by tuning the RF amplifier 12 to the channel frequency for the read channel number (S52), and converting the oscillating frequency of the local oscillator 14 to select the channel. And the procedure returns.

If the state of the read flag (S52) is on (=1) (S54), the microcomputer 22 turns on the booster 31 by switching the contact point 28 to the input terminal side of the high gain RF amplifier 31 by means of the switch circuit 29 (S60), make the tuning operation (S58) by tuning the RF amplifier 12 to the channel frequency for the read channel number (S52) and converting the oscillating frequency of the local oscillator 14 to select the channel. And the procedure returns.

[Effect of the Invention]

The television tuner contains a wide band RF amplifier, and is not required to turn on or off the wide band RE amplifier for each channel, whereby the excellent characteristics of image quality can be obtained irrespective of whether or not the television radio wave is weak or strong in the electric field.

Also, the television receiver having the television tuner contains a wide band RF amplifier, and is not required to turn on or off the wide band RF amplifier for each channel, whereby the excellent characteristics of image quality can be obtained irrespective of whether or not the television radio wave is weak or strong in the electric field.

What is claimed is:

1. A television tuner having a reference frequency for each channel number of television radio wave, which is tuned to a television radio wave of a channel number by changing a tuning frequency of an RF amplifier on the basis of the reference frequency of the channel number, upon setting the channel number, the tuning frequency that is tuned being set up as the frequency of the channel number, and the television radio wave of the set frequency being received as the television radio wave of the channel number, said television tuner comprising:

a booster for boosting the television radio wave to be fed to said RF amplifier, inhibit means for inhibiting the operation of said booster by an operation from the outside, and memory means for memorizing an operation state of said inhibit means corresponding to the channel number when setting the tuning frequency as the frequency of said channel number, wherein when the channel number is selected, said inhibit means is placed in the operation state memorized by said memory means corresponding to the channel number.

2. The television receiver, wherein said television tuner according to claim 1 is provided.

3. A television tuner having a reference frequency for each channel number of television radio wave, which is tuned to a television radio wave of a channel number by changing a tuning frequency of an RF amplifier successively on the basis of the reference frequency of the channel number, upon setting the channel number, the tuning frequency that is tuned being set up successively as the frequency of said channel number, and the television radio wave of the set frequency that is set up successively being received as the television radio wave of said channel number, said television tuner comprising:

a booster for boosting the television radio wave to be fed to said RF amplifier, inhibit means for inhibiting the operation of said booster, determination means for determining whether or not the signal level of the tuning frequency that is tuned to the television radio wave of the channel number is greater than or equal to a predetermined value, turning off means for turning off the operation of said inhibit means, if said determination means determines that the signal level is not greater than or equal to the predetermined value, tuning means for tuning in the television radio wave by changing the tuning frequency of said RF amplifier in a state where said inhibit means is turned off, and memory means for memorizing an operation state of said inhibit means corresponding to said channel number when setting said tuning frequency to which said tuning means tunes as the frequency of said channel number, wherein when the channel number is selected, said inhibit means is placed in the operation state memorized by said memory means corresponding to the channel number.

4. The television receiver, wherein said television tuner according to claim 3 is provided.

* * * * *